(No Model.) 3 Sheets—Sheet 1.
C. & H. BURGON.
FRICTION GEAR.
No. 550,862. Patented Dec. 3, 1895.
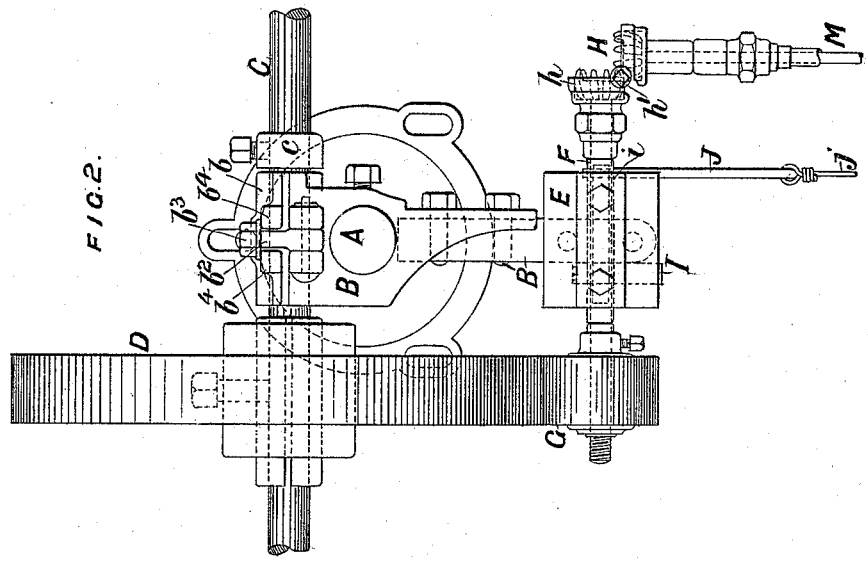
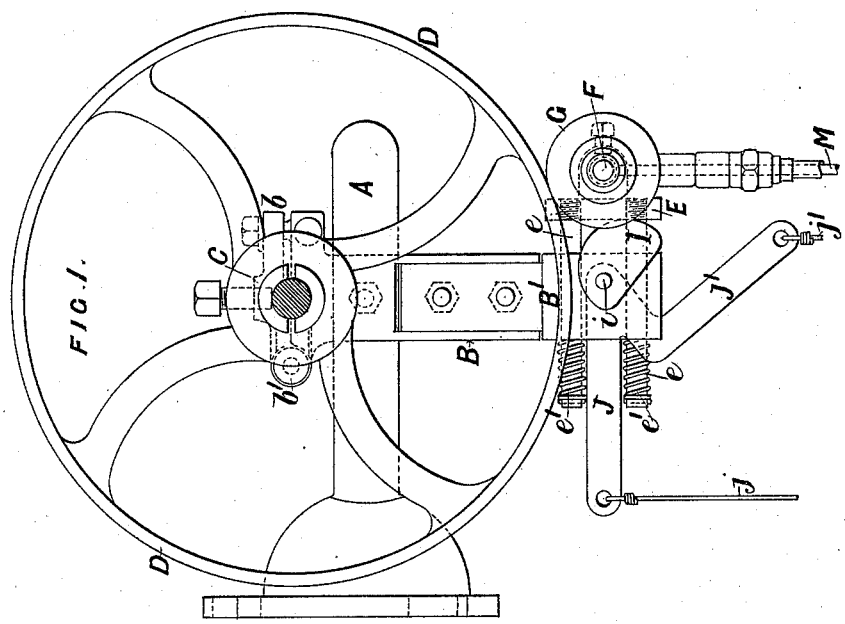
WITNESSES.
C. Sedgwick
T. W. Hanaford.
INVENTORS
C. Burgon
H. Burgon
by Munn & Co.
ATTORNEYS (No Model.) 3 Sheets—Sheet 2.
C. & H. BURGON.
FRICTION GEAR.
No. 550,862. Patented Dec. 3, 1895.
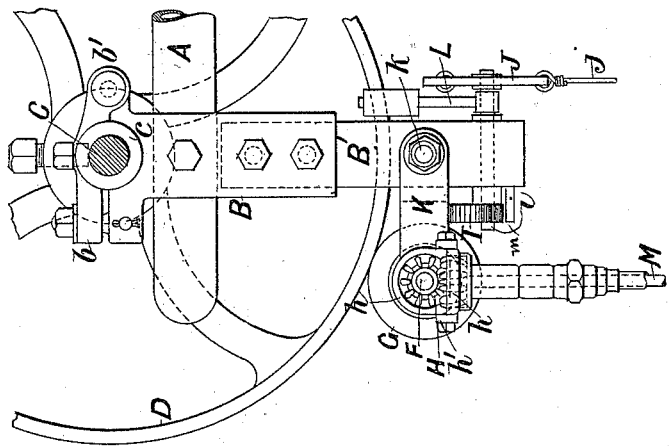
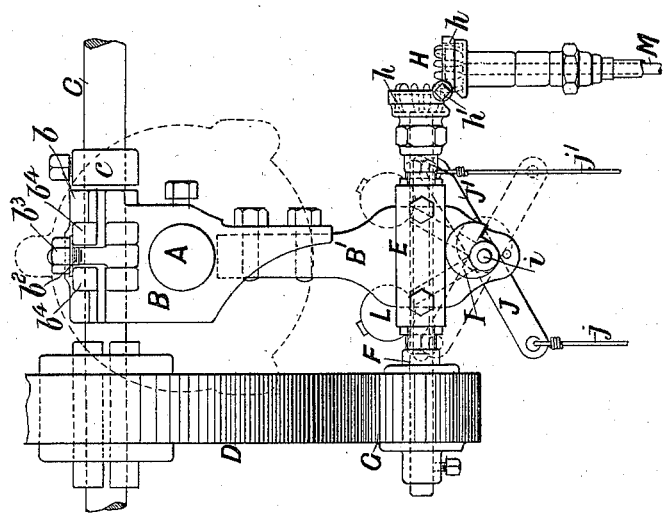
WITNESSES.
C. Sedgwick
J. W. Hanaford.
INVENTORS
C. Burgon
BY H. Burgon
Munn & Co
ATTORNEYS

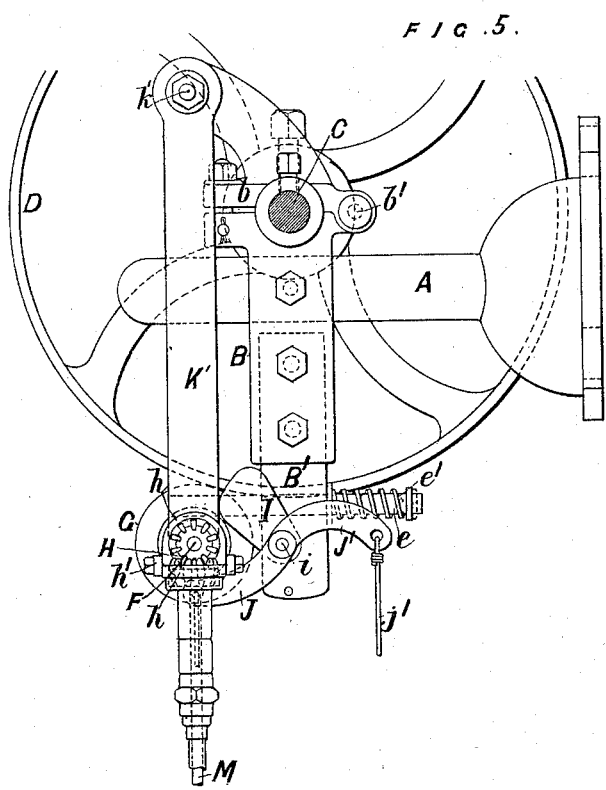

UNITED STATES PATENT OFFICE.

CHARLES BURGON AND HARRY BURGON, OF MALIN BRIDGE, ENGLAND.

FRICTION-GEAR.

SPECIFICATION forming part of Letters Patent No. 550,862, dated December 3, 1895.

Application filed March 24, 1894. Serial No. 504,986. (No model.)

*To all whom it may concern:*

Be it known that we, CHARLES BURGON and HARRY BURGON, sheep-shear manufacturers, of Malin Bridge, near Sheffield, in the county of York, England, have invented new and useful Improvements in Friction-Gear for Driving Sheep-Shearing and Like Machines, of which the following is a full, clear, and exact description.

This invention relates to friction-gear for transmitting motion from a line of shafting to flexible or jointed shafts by which shearing or clipping machines are driven. The bevel friction-gear commonly used has the defect of causing end-thrust on the line of shafting, and when such gearing is used on long lines of shafting in climates subject to extremes of temperature the longitudinal expansion and contraction of the shafting is liable to put the friction-wheels out of working position.

This invention has for its object to obviate these defects by the employment of peripheral friction-gear, the driven pinion being on a counter-shaft parallel to the main line of shafting, and the faces of the driving-pulley and pinion are also parallel to the main shafting and of sufficient breadth to permit of any lateral deviation of the driving-pulley with regard to the pinion likely to arise from longitudinal expansion and contraction of the main shaft without affecting the frictional driving contact of the pulley and pinion. For the purpose of putting the pinion in and out of driving contact the counter-shaft is mounted in a bearing which is movable in a direction approximately tangential to the pulley under the stress of springs or a tumbler-weight acting directly or through a cam or screw and controlled by a lever for putting the pinion in and out of frictional contact with the pulley. The first member of the flexibly-jointed transmission-shaft is coupled to the pinion-shaft by a universal toothed coupling, which allows of the one shaft assuming any angle with regard to the other through a range of one hundred and eighty degrees.

Reference is to be had to the accompanying drawings, forming part of this specification, wherein—

Figure 1 is a front elevation, and Fig. 2 a side elevation, of one arrangement of the improved friction-gear. Figs. 3 and 4 are similar views of another arrangement. Fig. 5 is a side elevation of another arrangement.

The same letters of reference denote like parts in all the figures.

A is one of the wall-pillars, on which are carried the brackets B, supporting the bearings for the line of shafting.

D is one of the driving-pulleys, keyed on the shafting C. The shafting C is of full diameter where it passes through the bearings, and there is sufficient play between the collar $c$ on the one side and the boss of the pulley D on the other to allow of any endwise motion of the shafting C in its bearings due to longitudinal expansion and contraction of the shafting. The cap $b$ of the shaft-bearing is hinged at $b'$ and secured by an eyebolt $b^2$, pivoted to the lower half of the bearing and engaging by its nut $b^3$ with lugs $b^4$ on the hinged cap $b$, between which the eyebolt passes.

To the bracket B is bolted a hanger B', which supports the bearing E of a counter-shaft F, on one end of which is keyed the pinion G, to be driven by frictional peripheral contact with the pulley D. On the other end of the counter-shaft is mounted the universal toothed coupling H, through which motion is imparted to the pendent member M of the flexibly-jointed transmission-shaft.

The pinion G is put in and out of gear with the pulley D by motion in a plane almost tangential to the pulley D. For this purpose the bearing E of the counter-shaft F is provided with a pair of guide-rods $e$, fitted to slide through corresponding holes in the supporting-hanger B', and the pinion G is drawn into frictional peripheral contact with the pulley D by the stress of springs $e'$, confined upon said rods between the heads of the rods and the hanger B'.

I is a cam keyed on an axis $i$, pivoted in the hanger, the cam bearing against the back of the bearing E, so as to act in opposition to the springs $e'$, and J J' are the arms of a bent lever fast on the cam-axis $i$, to which pull-handles $j\ j'$ are attached for oscillating the cam in the one or other direction for putting the pinion in or out of gear.

The pinion G is made of disks of paper, leather, or other similar material tightly clamped together between cheek-plates on the hub of the pinion.

In the arrangement illustrated in Figs. 3 and 4 the bearing E of the pinion-shaft is carried by a forwardly-projecting radius-arm K, pivoted at $k$ to the hanger B' and resting on the cam I, by which the pinion is raised and held in peripheral contact with the pulley D. The cam-shaft $i$ is pivoted in the hanger and is provided with an upwardly-projecting weighted arm L, which by falling over to the one side or the other of the vertical plane of the shaft $i$ retains the cam I in one or other of two positions for holding the pinion G in or out of gear with the pulley D, the shaft $i$ being operated to throw the weight over in the one or other direction by lever-arms J J' and pull-handles $jj'$, attached to the said lever-arms. In the one position of the cam (shown in full lines in Fig. 3) the pinion G is held in contact with the pulley D, and in the other position of the cam (shown in dotted lines) the pinion, its shaft, and bearing-bracket fall by gravity until the pinion is out of contact with the pulley, the motion of the weighted arm L in this direction being limited by a stop-lug or stop-pin $m$, against which the shoulder of the cam abuts.

In the arrangement shown in Fig. 5 the bearing of the pinion-shaft is hung by an arm K', pivoted at $k'$, to a bracket rising from the top half $b$ of the bearing B, and the pinion G is drawn into frictional contact with the pulley D by the stress of a spring $e'$, confined between the hanger B' and the head of a guide-rod $e$, sliding through the hanger and attached to the bearing E. I is the cam acting on the bearing E in opposition to the spring, the cam being fixed on an axis pivoted in the hanger and operated by lever-arms J J' and pull-handles, as before described.

In all these arrangements the universal toothed coupling H consists of a pair of combined crown and bevel-toothed pinions, whose wing-shaped teeth project both from the ends and periphery of the pinion, the one pinion being fast on the shaft F and the other on the shaft M and being held in gear by coupling bearings or collars $h$, loose on the ends of the shafts and hinged together on an axis $h'$ at right angles to the shafts and tangential to the pitch-circles of both pinions. This form of coupling applied to connect the pinion-shaft F and the shaft M allows great latitude of swinging motion of said shaft in all directions.

Having now particularly described and ascertained the nature of our said invention and in what manner the same is to be performed, we declare that what we claim is—

1. In gear for transmitting motion from a main line of shafting to flexible or jointed shafts, the combination with a main shaft and driving pulley thereon, of a countershaft parallel to the main shaft, a pinion on the countershaft, a bearing for the countershaft, a fixed support on which said bearing is movable toward and from the driving pulley, a pressure-exerting device applied to act on the countershaft bearing to press the pinion into driving contact with the pulley, a cam acting on the countershaft bearing in opposition to said pressure exerting device, and means for operating the cam, substantially as described.

2. In gear for transmitting motion from a main line of shafting to flexible or jointed shafts, the combination with a main shaft and driving pulley thereon, of a countershaft parallel to the main shaft, a pinion on the countershaft, a bearing for the countershaft, a radius arm pivoted to a fixed support and movable to carry the pinion toward and from the driving pulley, a cam adapted to raise the countershaft bearing until the pinion comes into contact with the driving pulley, or allow it to fall back therefrom by gravity, an upwardly projecting weighted arm fixed on the cam shaft so as to fall over to either side of the vertical plane of said shaft, and means for operating the weighted arm, substantially as described.

CHARLES BURGON.
HARRY BURGON.

In presence of—
HARRIETT MORTIMER,
HANNAH WARHURST.